United States Patent
Lee et al.

(10) Patent No.: US 8,015,835 B2
(45) Date of Patent: Sep. 13, 2011

(54) INTERNAL COOLING APPARATUS FOR AUTOMOBILES

(75) Inventors: Kwang Yong Lee, Daegu (KR); Young Jo Park, Daegu (KR); Dong Han Kim, Daegu (KR); Jung Yong Park, Daegu (KR); Jae Ho Jeong, Daegu (KR)

(73) Assignee: Korea Delphi Automotive Systems Corporation, Daegu (KR)

( * ) Notice: Subject to any disclaimer, the term of this patent is extended or adjusted under 35 U.S.C. 154(b) by 440 days.

(21) Appl. No.: 12/261,481

(22) Filed: Oct. 30, 2008

(65) Prior Publication Data

US 2009/0193827 A1 Aug. 6, 2009

(30) Foreign Application Priority Data

Nov. 2, 2007 (KR) .................. 10-2007-0111559

(51) Int. Cl.
*F25B 5/00* (2006.01)
*B60H 1/32* (2006.01)
*A47C 7/74* (2006.01)

(52) U.S. Cl. .................. 62/200; 62/244; 297/180.1
(58) Field of Classification Search .............. 62/199, 62/200, 244; 165/42, 202; 297/180.1, 180.15, 297/180.16

See application file for complete search history.

(56) References Cited

U.S. PATENT DOCUMENTS

| 2,722,266 | A | 11/1955 | Kersten |
| 5,138,851 | A | 8/1992 | Mardikian |
| 5,450,894 | A * | 9/1995 | Inoue et al. ............. 165/43 |
| 6,533,184 | B1 * | 3/2003 | Kim .................. 237/12.3 R |
| 7,264,046 | B1 | 9/2007 | Futernik et al. |
| 2005/0067158 | A1 * | 3/2005 | Ito et al. ................. 165/204 |

FOREIGN PATENT DOCUMENTS

| DE | 2220009 A1 | 11/1973 |
| FR | 2839473 A | 11/2003 |

OTHER PUBLICATIONS

European Search Report for European Application No. EP 08167490 corresponding to U.S. Appl. No. 12/261,481.

* cited by examiner

*Primary Examiner* — Marc Norman
(74) *Attorney, Agent, or Firm* — LRK Patent Law Firm

(57) ABSTRACT

An internal cooling apparatus for automobiles includes a first expansion valve for spraying a coolant to a main evaporator through a high-pressure pipe, a compressor receiving the coolant evaporated in the main evaporator through a low-pressure pipe, a condenser receiving the coolant compressed in the compressor, and a plurality of sub-evaporators each being installed inside of a seat to contact an automobile passenger. One end of each of the sub-evaporators is communicated with the high-pressure pipe and the other end thereof is communicated with the low-pressure pipe such that part of the coolant sprayed through the first expansion valve is supplied to the compressor via each of the sub-evaporators.

10 Claims, 6 Drawing Sheets

US 8,015,835 B2

INTERNAL COOLING APPARATUS FOR AUTOMOBILES

CROSS-REFERENCE TO RELATED APPLICATION

The benefit of priority is claimed to Republic of Korea patent application number 10-2007-0111559 filed Nov. 2, 2007, which is incorporated by reference in its entirety.

BACKGROUND

1. Field of the Invention

The present invention relates to an internal cooling apparatus for automobiles, and in more particular, to an internal cooling apparatus for automobiles, which can directly reduce the temperature of the seats or steering wheel to be contacted with the passengers.

2. Related Art

Automobiles are provided with HVAC equipment such as a heating system and an air conditioner, for the purposes of maintaining the internal temperature to an appropriate state and of the internal ventilation in the summer and winter seasons.

The above air conditioner includes an air duct formed of an integral injection molding. The front of the air duct is provided with an air suction door for suctioning external air and circulation-controlling internal air, and a blower unit for forcibly blowing the suctioned air.

Arranged at the front side of the blower unit are an evaporator and a heater core in sequence. The evaporator and the heater core are partitioned by a temperature controlling door.

At the front side of the evaporator and the heater core, cooled or heated air inflows through a defroster that adjacently contacts with the inside of vehicle by a distribution door, or a vent hole provided on the instrument panel.

FIG. 1 shows a conventional internal cooling apparatus for automobiles. Referring to FIG. 1, the internal cooling apparatus 10 for automobiles used in HVAC equipment includes a compressor 11 for converting a coolant (or refrigerant) into a high-temperature and high-pressure gas, a condenser 12 for liquefying the high-temperature and high-pressure gas, a receiver drier 13 for storing temporarily the coolant such that moisture and dust can be removed and an appropriate amount of coolant can be supplied to an evaporator 17 so as to conform to the cooling load, an expansion valve 15 for making the coolant into a low-temperature and low-pressure frost-like form for easy heat-exchange in the evaporator 17, and the evaporator 17 for performing heat-exchanging with the air being introduced by the blower unit 16 to thereby generate a cooled air. The coolant passing through the evaporator 17 is re-circulated again to the compressor 11.

The cooled air of which heat is taken away in the evaporator 17 is configured to be introduced into the interior of vehicle through a duct.

In the conventional internal cooling apparatus, at the beginning of driving, it takes much time for the hot interior air to be cooled. Further, in the case where the seat or the steering wheel that is to contact directly with the driver or the passengers, they feel a sense of significant discomfort.

In order to solve the above problems, a large amount of energy is to be consumed to rapidly lower the temperature, or the size of the internal cooling apparatus is to be increased.

Furthermore, the conventional cooling apparatus for automobiles utilizes air flow occurring in front of the passengers. Thus, the front side of human body that the air flow can directly contact can feel a sense of cooling. The back seat portion where the air flow becomes weaker cannot be provided with enough cooling effect. In addition, air ventilation cannot occur in the hip and back of the passengers that contact with the seat, thereby resulting in perspiration or discomfort.

SUMMARY

Accordingly, the present invention has been made in view of the above-mentioned problems occurring in the prior art, and it is a primary object of the present invention to provide an internal cooling apparatus for automobiles, in which a sub-evaporator is installed in the seat or steering wheel to directly reduce the temperature thereof.

To accomplish the above object of the present invention, according to one aspect of the present invention, there is provided an internal cooling apparatus for automobiles. The cooling apparatus comprises: a first expansion valve for spraying a coolant to a main evaporator through a high-pressure pipe; a compressor receiving the coolant evaporated in the main evaporator through a low-pressure pipe; a condenser receiving the coolant compressed in the compressor; and a plurality of sub-evaporators each being installed inside of a seat to contact an automobile passenger, wherein one end of each of the sub-evaporators is communicated with the high-pressure pipe and the other end thereof is communicated with the low-pressure pipe such that part of the coolant sprayed through the first expansion valve is supplied to the compressor via each of the sub-evaporators.

According to another aspect of the invention, there is provided an internal cooling apparatus for automobiles. The cooling apparatus comprises: a first expansion valve for spraying a coolant to a main evaporator through a high-pressure pipe; a compressor receiving the coolant evaporated in the main evaporator through a low-pressure pipe; a condenser receiving the coolant compressed in the compressor; a second expansion valve receiving part of the coolant passing through the condenser; and a plurality of sub-evaporators each being installed inside a seat to contact with an automobile passenger, wherein one end of each of the sub-evaporators is communicated with the second expansion valve and the other end thereof is communicated with the low-pressure valve such that the coolant sprayed through the second expansion valve is supplied to the compressor through each of the sub-evaporators.

In an embodiment, the sub-evaporator is formed of a resin tube.

In an embodiment, the sub-evaporator is formed of a resin tube fixedly installed, and a housing wrapping around the resin tube.

In an embodiment, the resin tube is sewn or bonded to the housing.

In an embodiment, the housing is provided with a filler material holding the resin tube.

According to another aspect of the invention, there is provided an internal cooling apparatus for automobiles. The cooling apparatus comprises: a first expansion valve for spraying a coolant to a main evaporator through a high-pressure pipe; a compressor receiving the coolant evaporated in the main evaporator through a low-pressure pipe; a condenser receiving the coolant compressed in the compressor; a second expansion valve receiving part of the coolant passing through the condenser; and a sub-evaporator being installed in a steering wheel to contact with an automobile passenger, wherein one end of the sub-evaporator is communicated with the second expansion valve, and the other end thereof is communicated with the low-pressure pipe such that the coolant sprayed through the second expansion valve is supplied to the compressor through the sub-evaporator.

In an embodiment, the sub-evaporator is a resin tube wrapping around a handle portion of the steering wheel.

In an embodiment, the sub-evaporator is formed of a resin tube and a plurality of prominences and depressions are formed in the inner diameter of the resin tube in radial directions.

In an embodiment, the sub-evaporator is formed of a resin tube and a plurality of prominences and depressions are formed in the resin tube in circumferential directions.

In an embodiment, each of the sub-evaporators is provided with an operation valve capable of turning on or off flow of the coolant.

In an embodiment, the cooling apparatus further comprises a sensor for detecting seating of a passenger, and a control unit for controlling on or off of the operation valve according to signals from the sensor.

In an embodiment, the pipe communicating the condenser and the first expansion valve with each other is provided with a connection pipe for supplying the coolant to the second expansion valve.

In an embodiment, the sub-evaporator is formed of a resin tube and the low-pressure pipe communicating the condenser and the main evaporator with each other is provided with a connection pipe, wherein one end of the connection pipe is connected with the resin tube.

As described above, since a sub-evaporator is installed in the seat or steering wheel of automobiles, the seat or steering wheel can be directly cooled to provide a sense of comfort to the passengers, even when the interior temperature is high in the summer season or the like.

Further, in a case of a professional driver, a skin disease such as heat rashes can be prevented.

In addition, since the sub-evaporator installed in the seat or steering wheel is configured to enable on and off separately from the entire cooling equipment of automobiles, it can be used in a convenient manner.

Furthermore, since the operation valve is automatically turned on or off by means of a sensor and a control unit, the temperature of the seat or steering wheel can be controlled automatically, without any separate operation.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

Hereinafter, the preferred embodiments of the present invention will be described in detail with reference to the accompanying drawings.

Figure 1:
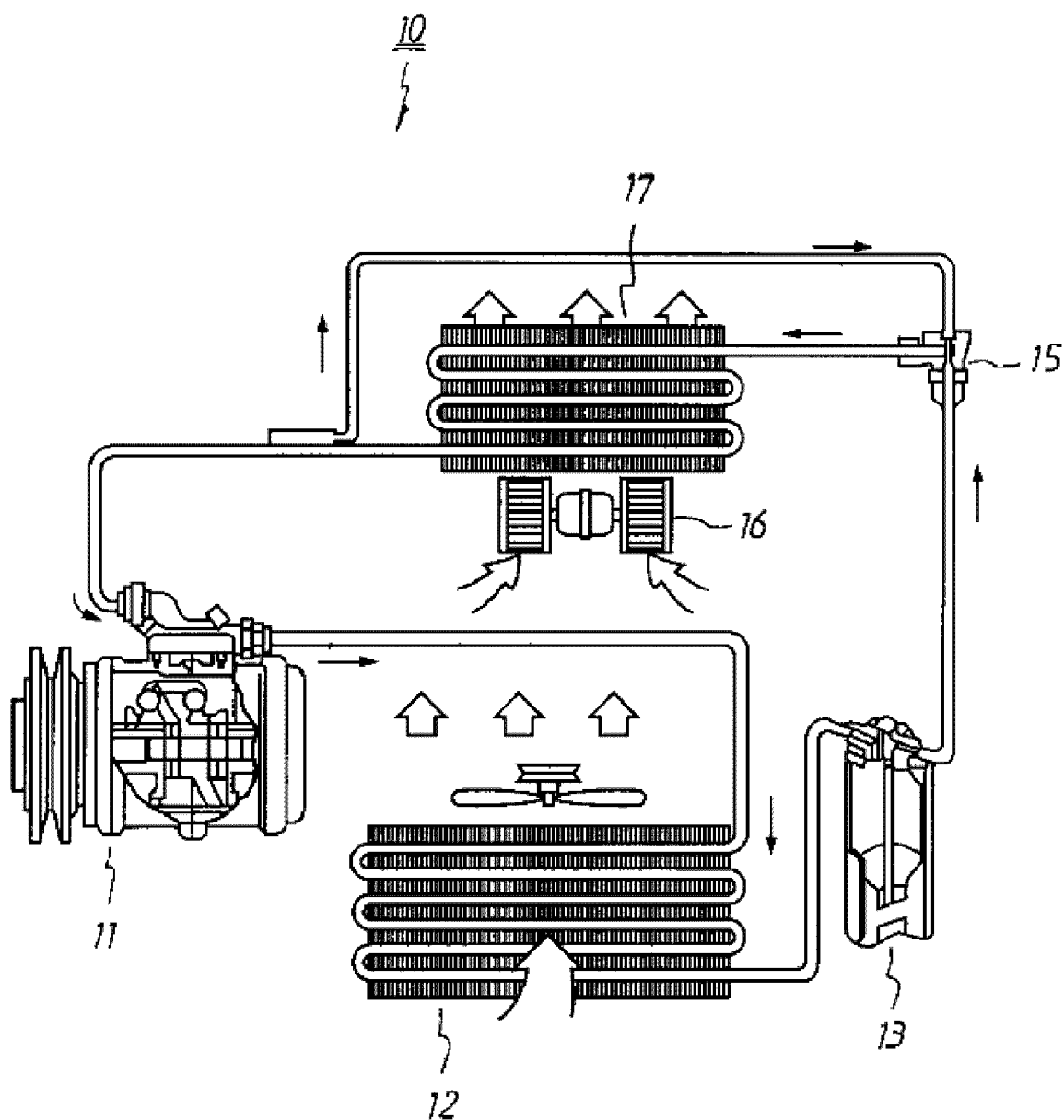
FIG. 1 shows a conventional internal cooling apparatus for automobiles.
Figure 2:
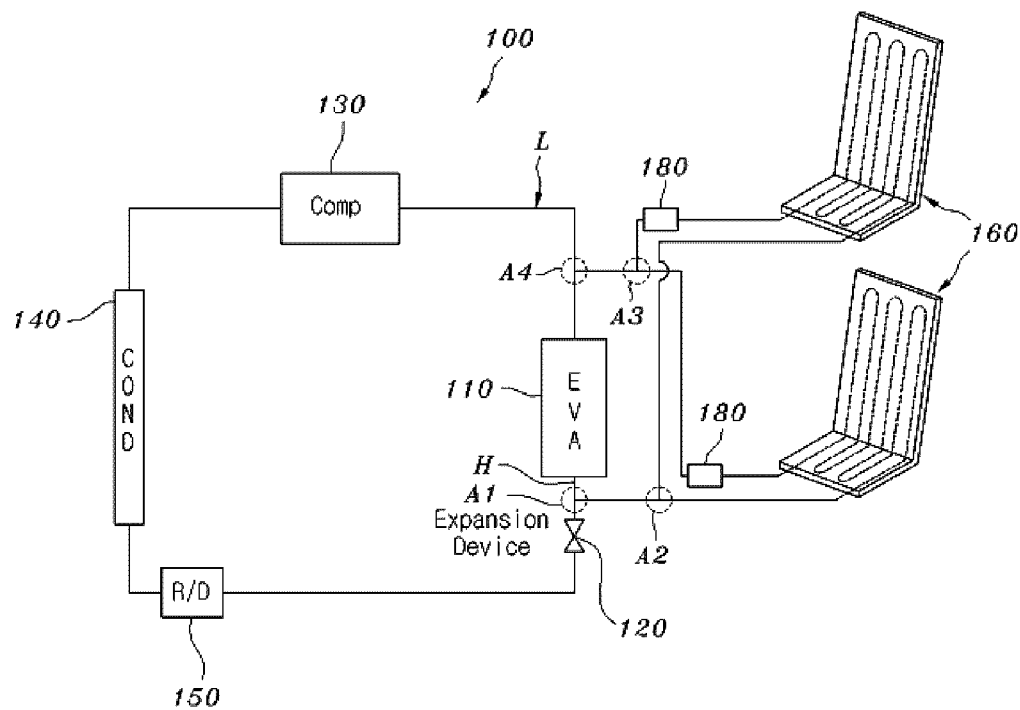
FIG. 2 illustrates an internal cooling apparatus using a single expansion valve according to an embodiment of the invention.
Figure 3:
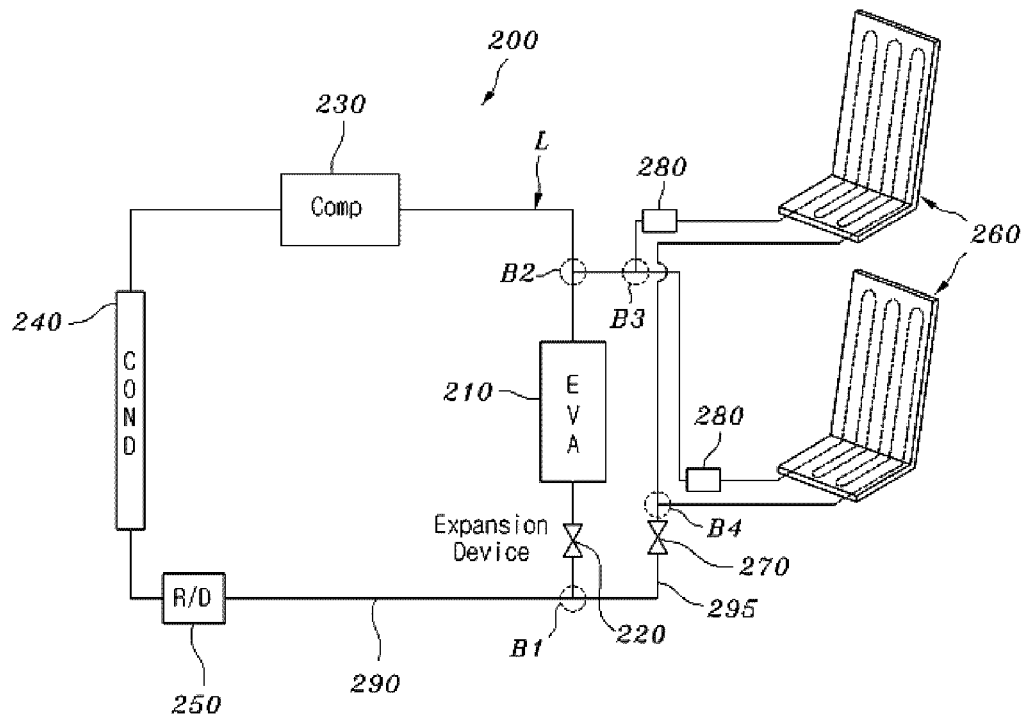
FIG. 3 illustrates an internal cooling apparatus using a plurality of expansion valves according to an embodiment of the invention.
Figure 4:
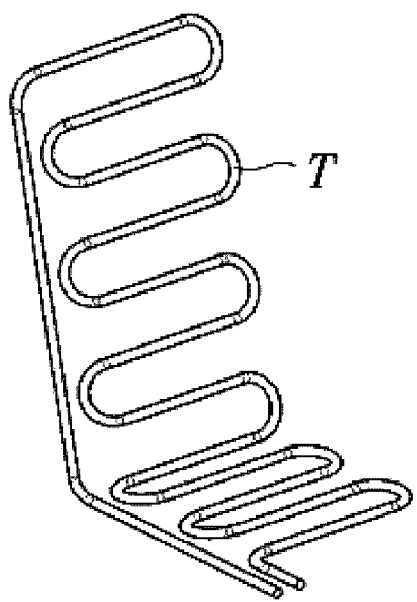
FIG. 4 is a perspective view showing a sub-evaporator to be installed in a seat of automobiles, in an internal cooling apparatus according to an embodiment of the invention.
Figure 5:
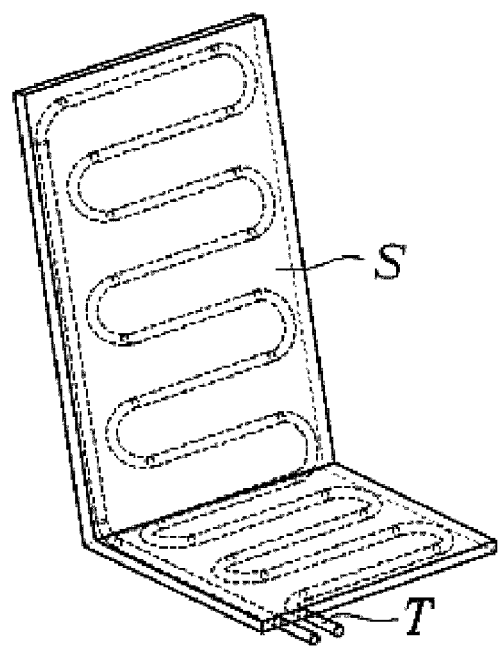
FIG. 5 is a perspective view showing a sub-evaporator to be installed in a seat of automobiles, in an internal cooling apparatus according to another embodiment of the invention.
Figure 6:
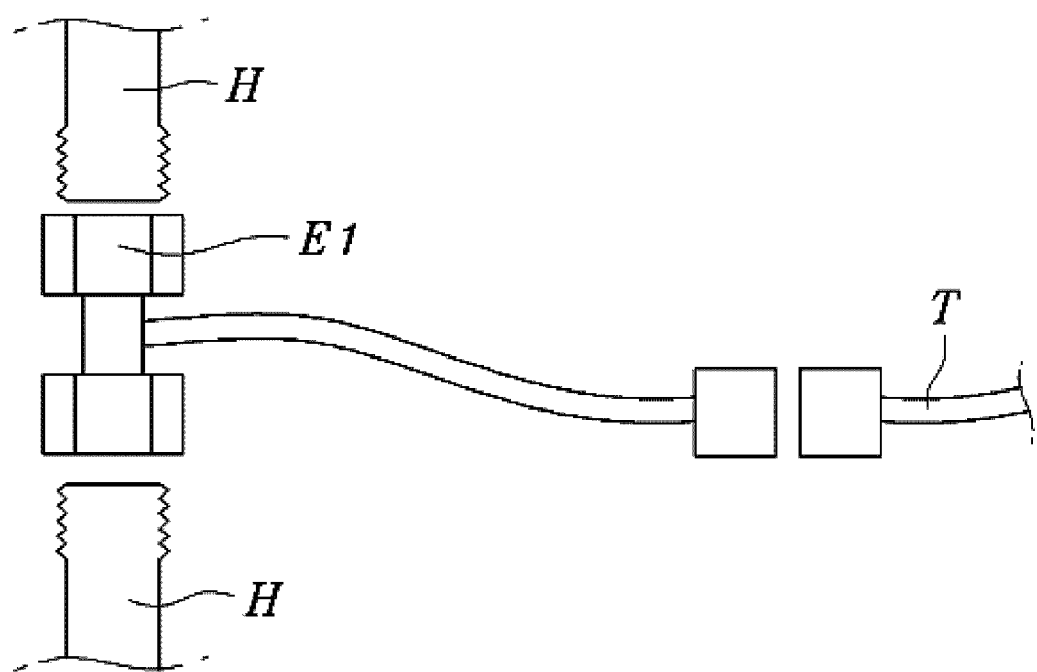
FIG. 6 explains details on the connection of A1 portion in FIG. 2.
Figure 7:
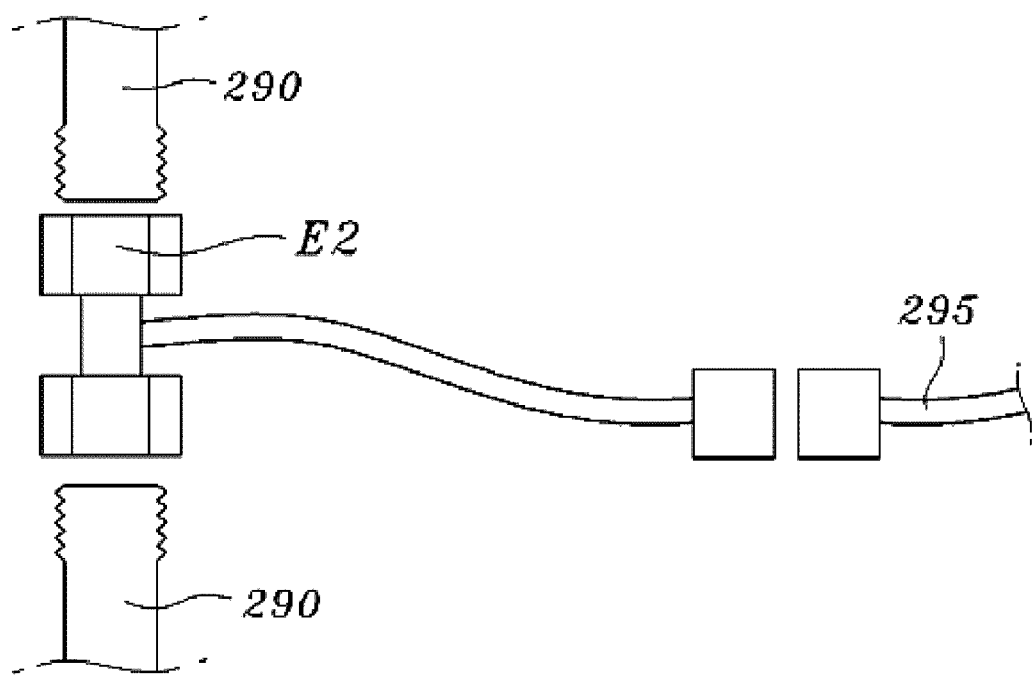
FIG. 7 explains details on the connection of B1 portion in FIG. 3.
Figure 8:
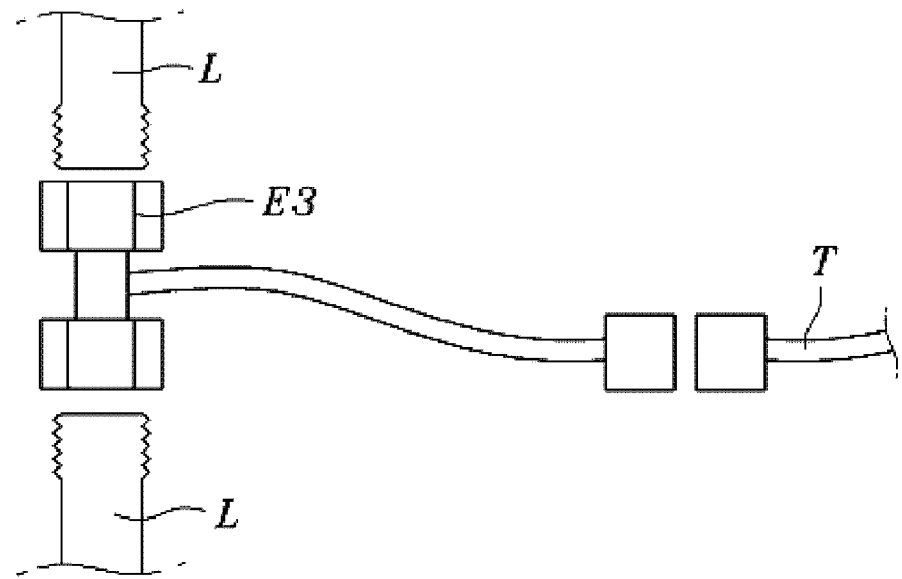
FIG. 8 explains details on the connection of B2 portion in FIG. 3.
Figure 9:
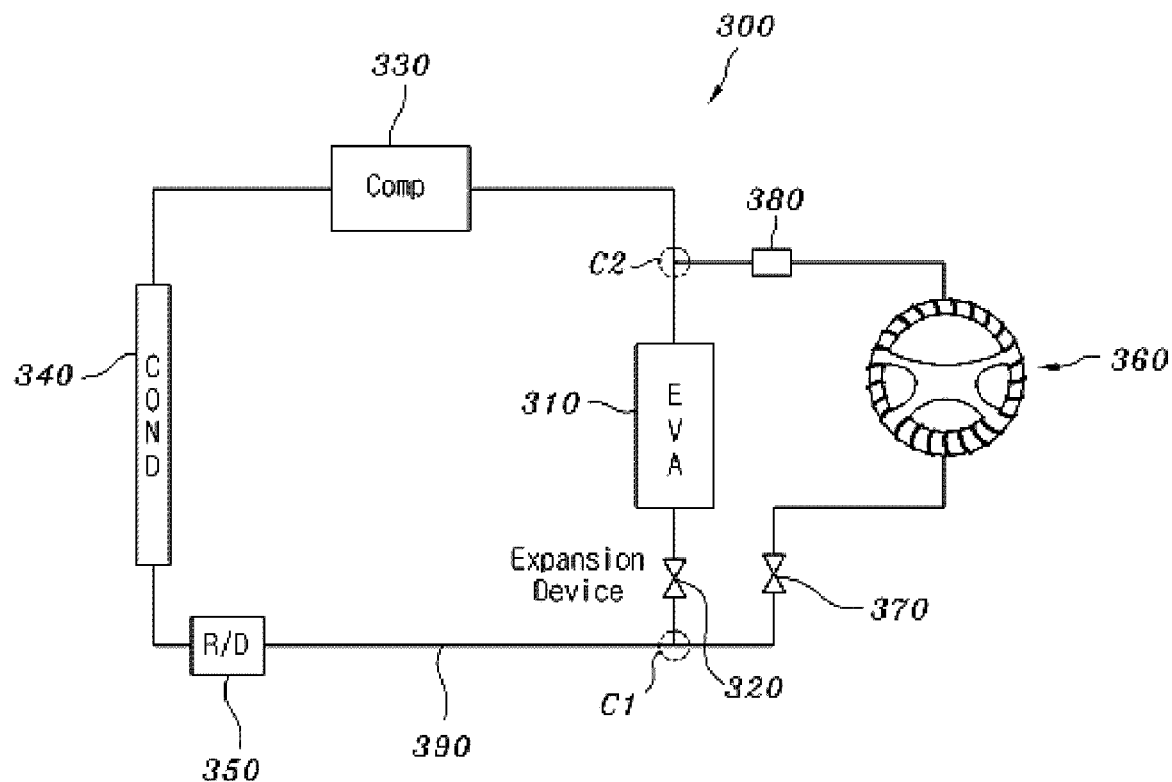
FIG. 9 illustrates an internal cooling apparatus for automobiles according to an embodiment of the invention where a sub-evaporator is installed in the steering wheel.
Figure 10:
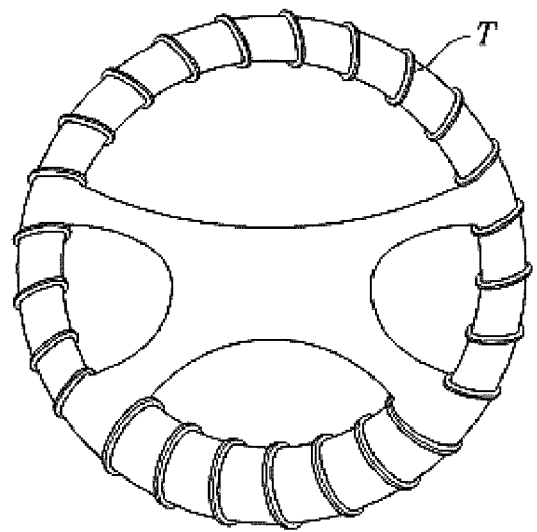
FIG. 10 is an elevation showing an internal apparatus for automobiles according to an embodiment of the invention where a sub-evaporator is installed in the steering wheel.
Figure 11:
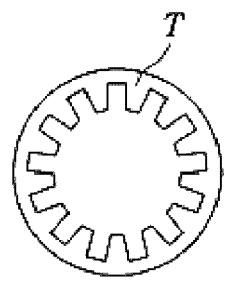
FIG. 11 is a cross-sectional view showing a resin tube in an internal cooling apparatus according to an embodiment of the invention.
Figure 12:
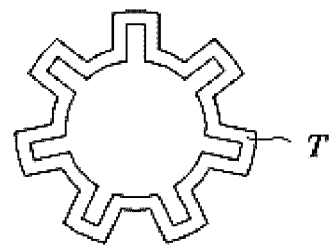
FIG. 12 is a cross-sectional view showing a resin tube in an internal cooling apparatus according to another embodiment of the invention.

FIG. 1 shows a conventional internal cooling apparatus for automobiles. FIG. 2 illustrates an internal cooling apparatus using a single expansion valve according to an embodiment of the invention. FIG. 3 illustrates an internal cooling apparatus using a plurality of expansion valves according to an embodiment of the invention. FIG. 4 is a perspective view showing a sub-evaporator to be installed in a seat of automobiles, in an internal cooling apparatus according to an embodiment of the invention. FIG. 5 is a perspective view showing a sub-evaporator to be installed in a seat of automobiles, in an internal cooling apparatus according to another embodiment of the invention. FIG. 6 explains details on the connection of A1 portion in FIG. 2. FIG. 7 explains details on the connection of B1 portion in FIG. 3. FIG. 8 explains details on the connection of B2 portion in FIG. 3. FIG. 9 illustrates an internal cooling apparatus for automobiles according to an embodiment of the invention where a sub-evaporator is installed in the steering wheel. FIG. 10 is an elevation showing an internal apparatus for automobiles according to an embodiment of the invention where a sub-evaporator is installed in the steering wheel. FIG. 11 is a cross-sectional view showing a resin tube in an internal cooling apparatus according to an embodiment of the invention. FIG. 12 is a cross-sectional view showing a resin tube in an internal cooling apparatus according to another embodiment of the invention.

FIG. 2 illustrates an internal cooling apparatus for automobiles including a single first expansion valve according to an embodiment of the invention.

In this embodiment, the internal cooling apparatus 100 comprises a first expansion valve 120 that sprays a coolant to a main evaporator 110 through a high-pressure pipe H, a compressor 130 being supplied with the coolant evaporated in the main evaporator 110 through a low-pressure pipe L, and a condenser 140 to which the coolant being compressed in the compressor 130 is transferred. The internal cooling apparatus 100 is installed inside the seats of automobiles, and comprises a plurality of sub-evaporators 160, one end of which is communicated with the high-pressure pipe H and the other end of which is communicated with the low-pressure pipe L to supply the coolant sprayed through the first expansion valve 120 to the compressor.

The internal cooling apparatus 100 may be provided with a receiver drier 150 between the condenser 140 and the first expansion valve 120. The receiver drier 150 stores temporarily the coolant entered the condenser 140 and then supplies the coolant to the first expansion valve 120.

As illustrated in FIG. 4, the sub-evaporators 160 may be formed of a resin tube T. That is, the resin tube T is bent at regular intervals and arranged widely inside an automobile seat. One end of the resin tube is communicated with the high-pressure pipe H and the other end thereof is communicated with the low-pressure pipe L, such that the resin tube T can serve as an evaporator.

Alternatively, as illustrated in FIG. 5, the sub-evaporators 160 is comprised of a resin tube T fixedly installed and a housing S wrapping around the resin tube. The resin tube T is fixedly installed by being sewn or bonded to the housing S. Further, a filler material may be filled in the housing S in order for the resin tube T not to protrude to the surface of the housing S. Both end portions of the resin tube T are exposed to outside of the housing S to be able to communicate with the high-pressure pipe H and the low-pressure pipe L. In addition, the both ends of the resin tube T are close to each other to enable an easy assembling of the entire system.

As illustrated in FIG. 2, the sub-evaporators 160 may be provided with an operation valve 180 to turn on or off the flow of the coolant. Further, the sub-evaporators 160 may comprise a sensor for detecting seating of a passenger, and a control unit for controlling on or off of the operation valve according to signals from the sensor.

As illustrated at a position A1 of FIG. 2, a connection pipe E1 may be provided in the high-pressure pipe H communicating the main evaporator 110 and the first expansion valve 120 with each other. The connection pipe E1 supplies the coolant to the sub-evaporators 160. In addition, one end of the connection pipe E1 is communicated with the resin tube. Similar connection pipes may be provided at positions A2, A3 and A4 in FIG. 2.

FIG. 3 illustrates an internal cooling apparatus for automobiles using a plurality of expansion valves according to an embodiment of the invention.

In this embodiment, the internal cooling apparatus 200 comprises a first expansion valve 220 that sprays a coolant to a main evaporator 210 through a high-pressure pipe H, a compressor 230 being supplied with the coolant evaporated in the main evaporator 210 through a low-pressure pipe L, and a condenser 240 to which the coolant compressed by the compressor 230 is transferred. The internal cooling apparatus 200 further comprises a second expansion valve 270 being supplied with the coolant passing through the condenser 240, and a plurality of sub-evaporators 260 installed inside automobile seats. One end of the sub-evaporators 260 is communicated with the second expansion valve 270 and the other end thereof is communicated with the low-pressure pipe L and thus supplies the coolant sprayed through the second expansion valve 270 to the compressor 230.

The internal cooling apparatus 200 may be provided with a receiver drier 250 between the condenser 240 and the first expansion valve 220. The receiver drier 250 stores temporarily the coolant entered the condenser 240 and then supplies the coolant to the first expansion valve 220.

As illustrated in FIG. 4, the sub-evaporators 260 may be formed of a resin tube T. Alternatively, as illustrated in FIG. 5, the sub-evaporators 260 are comprised of a resin tube T fixedly installed and a housing S wrapping around the resin tube T. The resin tube T is fixedly installed by being sewn or bonded to the housing S. Further, a filler material may be filled in the housing S in order for the resin tube T not to protrude to the surface of the housing S. Both end portions of the resin tube T are exposed to outside of the housing S to be able to communicate with the second expansion valve 270 and the low-pressure pipe L. In addition, the both ends of the resin tube T are close to each other to enable an easy assembling of the entire system.

As illustrated in FIG. 3, the sub-evaporators 260 may be provided with an operation valve 280 to turn on or off the flow of the coolant. Further, the sub-evaporators 260 may comprise a sensor for detecting seating of a passenger, and a control unit for controlling on or off of the operation valve according to signals from the sensor.

As illustrated in FIG. 7, at a position B1 of FIG. 3, a connection pipe E2 may be provided in a connection pipe 290 communicating the condenser 240 and the first expansion valve 220 with each other. The connection pipe E2 supplies the coolant to the second expansion valve 270. That is, one side of the connection pipe E2 is connected with a pipe 295 coupled with the second expansion valve 270.

Further, as illustrated in FIG. 8, at a position B2 of FIG. 3, a connection pipe E3 is provided in the low-pressure pipe L communicating the compressor 230 and the main evaporator 210 with each other. One end of the connection pipe E3 may be connected to the resin tube T.

Similar connection pipes may be provided at positions B3 and B4 in FIG. 3.

FIG. 9 illustrates an internal cooling apparatus where a sub-evaporator is installed in the steering wheel of automobiles according to an embodiment of the invention.

In this embodiment, the internal cooling apparatus comprises a first expansion valve 320 that sprays a coolant to a main evaporator 310 through a high-pressure pipe H, a compressor 330 being supplied with the coolant evaporated in the main evaporator 310 through a low-pressure pipe L, and a condenser 340 to which the coolant compressed by the compressor 330 is transferred. The internal cooling apparatus 300 further comprises a second expansion valve 370 being supplied with the coolant passing through the condenser 340, and a sub-evaporator 360 installed inside a steering wheel of automobiles. One end of the sub-evaporator 360 is communicated with the second expansion valve 370 and the other end thereof is communicated with the low-pressure pipe L and thus supplies the coolant sprayed through the second expansion valve 370 to the compressor 330.

The internal cooling apparatus 300 may be provided with a receiver drier 350 between the condenser 340 and the first expansion valve 320. The receiver drier 350 stores temporarily the coolant entered the condenser 340 and then supplies the coolant to the first expansion valve 320.

As illustrated in FIG. 10, the sub-evaporator 360 may be formed of a resin tube T wrapped around a handle portion of the steering wheel.

Further, the resin tube, which is wrapped around the steering wheel, is wrapped with a housing containing a filler material, thereby avoiding the resin tube T from protruding to the outside.

As illustrated in FIG. 9, the sub-evaporator 360 may be provided with an operation valve 380 to turn on or off the flow of the coolant. Further, the sub-evaporator 360 may comprise a sensor for detecting seating of a passenger, and a control unit for controlling on or off of the operation valve 380 according to signals from the sensor.

Further, a connection pipe as explained above is provided in positions C1 and C2 of FIG. 9. That is, a connection pipe for supplying the coolant to the second expansion valve 370 may be provided at the position C1 in the connection pipe 390, which communicates the condenser 340 and the first expansion valve 320 with each other.

Furthermore, in the low-pressure pipe L communicating the compressor 330 and the main evaporator 310 to each other, a connection pipe may be provided at the position C2. One end of the connection pipe may be connected to the resin tube T.

Here, the inner diameter of the resin tube T illustrated in FIGS. 2 to 10 may be formed with a plurality of prominences and depressions in radial directions, as illustrated in FIG. 11.

Alternatively, as illustrated in FIG. 12, the resin tube T may be formed with a plurality of prominences and depressions along the outer circumferential direction. That is, the cross-sectional area of the resin tube is enlarged to enable more efficient evaporation.

Hereafter, operations and effects of the internal cooling apparatus according to embodiments of the invention will be explained.

First, referring to FIG. 2, when a passenger is seated, a driver operates the internal cooling device and opens the operation valve 180. Of course, the sensor can detect seating of a driver or a passenger and send a signal to the control unit to open the operation valve 180.

If the operation valve 180 is opened, the coolant passing through the first expansion valve 120 can flow the plurality of sub-evaporators 160. That is, while the coolant flows the sub-evaporators 160 installed in the seats of the automobile, the heat of the seats is directly taken to rapidly decrease the temperature of the seats, so that the driver and passengers can feel a sense of cooling in their hips and backs.

In a case where the seats are cooled enough, the operation valve 180 can be turned off.

Operations of the internal cooling apparatus illustrated in FIG. 3 will be explained below.

When a passenger is seated, a driver operates the internal cooling apparatus and opens the operation valve 280. Of course, the sensor can detect seating of a driver or a passenger and then send a signal to the control unit to open the operation valve 280.

If the operation valve 280 is opened, the coolant passing through the second expansion valve 270 can flow the plurality of sub-evaporators 260. That is, while the coolant flows the sub-evaporators 260 installed in the seats of automobiles, the heat of the seats is directly taken to reduce the temperature of the seats rapidly, so that the driver and passengers can feel a sense of cooling in their hips and backs. Of course, if the seat is enough cooled, the operation valve 280 can be turned off.

If the second expansion valve 270 is used for the sub-evaporators 260, the load imposed on the first expansion valve 220 can be reduced.

Next, operations of the internal cooling apparatus illustrated in FIG. 9 will be explained below.

When a passenger is seated, a driver operates the internal cooling apparatus and opens the operation valve 380. Of course, the sensor can detect seating of the driver or the passenger and send a signal to the control unit to open the operation valve 380.

If the operation valve 380 is opened, the coolant passing through the second expansion valve 370 can flow the sub-evaporator 360. That is, while the coolant flows the sub-evaporator 360 installed in the steering wheel of automobiles, the heat of the steering wheel is taken to rapidly reduce the temperature of the steering wheel, so that the driver can feel a sense of cooling in his or her hands. Of course, if the steering wheel is cooled enough, the operation valve 380 can be turned off.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An internal cooling apparatus for automobiles, the apparatus comprising:
   a first expansion valve;
   a main evaporator configured to receive a refrigerant from the first expansion valve through a high-pressure pipe;
   a compressor configured to receive the refrigerant evaporated in the main evaporator through a low-pressure pipe;
   a condenser configured to receive the refrigerant compressed in the compressor;
   a plurality of sub-evaporators formed of a resin tube, each configured to be installed inside a seat to contact with an automobile passenger; and
   a second expansion valve configured to receive a part of the refrigerant passing through the condenser;
   wherein the second expansion valve and the sub-evaporator are connected in parallel with the first expansion valve and the main evaporator,
   wherein the plurality of sub-evaporators are connected in parallel with one another, and
   wherein one end of each of the sub-evaporators is communicated with the second expansion valve and the other end thereof is communicated with the low-pressure pipe such that the refrigerant sprayed through the second expansion valve is supplied to the compressor through each of the sub-evaporators.

2. The apparatus according to claim 1, wherein a housing is wrapped around the resin tube.

3. The apparatus according to claim 2, wherein the resin tube is sewn or bonded to the housing.

4. The apparatus according to claim 2, wherein the housing is provided with a filler material holding the resin tube.

5. The apparatus according to claim 1, wherein the sub-evaporator is formed of a resin tube and a plurality of prominences and depressions are formed in the inner diameter of the resin tube in radial directions.

6. The apparatus according to claim 1, wherein the sub-evaporator is formed of a resin tube and a plurality of prominences and depressions are formed in the resin tube in circumferential directions.

7. The apparatus according to claim 1, wherein each of the sub-evaporators is provided with an operation valve capable of turning on or off flow of the refrigerant.

8. The apparatus according to claim 1, further comprising:
   a sub-evaporator for a steering wheel configured to be installed in a steering wheel to contact with an automobile passenger,
   wherein one end of the sub-evaporator for the steering wheel is communicated with the second expansion valve, and the other end thereof is communicated with the low-pressure pipe such that the refrigerant sprayed through the second expansion valve is supplied to the compressor through the sub-evaporator for the steering wheel.

9. The apparatus according to claim 8, wherein the sub-evaporator for the steering wheel is a resin tube wrapping around a handle portion of the steering wheel.

10. The apparatus according to claim 1, further comprising a sensor for detecting seating of a passenger, and a control unit for controlling on or off of the operation valve according to signals from the sensor.

* * * * *